US012115772B2

(12) United States Patent
Roeder et al.

(10) Patent No.: US 12,115,772 B2
(45) Date of Patent: Oct. 15, 2024

(54) METHOD AND APPARATUS FOR COLD-STAMPING ONTO THREE-DIMENSIONAL OBJECTS

(71) Applicants: ISIMAT GmbH Siebdruckmaschinen, Ellwangen (DE); LEONHARD KURZ Stiftung & Co. KG, Fuerth (DE)

(72) Inventors: Wolfgang Roeder, Remshalden (DE); Volker Schmitt, Fuerth (DE); Franz Rauner, Eislingen (DE)

(73) Assignees: ISIMAT GMBH SIEBDRUCKMASCHINEN, Ellwangen (DE); LEONHARD KURZ STIFTUNG & CO. KG, Fuerth (DE)

( * ) Notice: Subject to any disclaimer, the term of this patent is extended or adjusted under 35 U.S.C. 154(b) by 0 days.

(21) Appl. No.: 17/035,395

(22) Filed: Sep. 28, 2020

(65) Prior Publication Data

US 2021/0008867 A1 Jan. 14, 2021

Related U.S. Application Data

(62) Division of application No. 14/652,976, filed as application No. PCT/EP2013/077200 on Dec. 18, 2013, now Pat. No. 10,807,357.

(30) Foreign Application Priority Data

Dec. 18, 2012 (DE) ..................... 10 2012 112 556.2

(51) Int. Cl.
*B41F 16/00* (2006.01)
*B41F 17/00* (2006.01)
(Continued)

(52) U.S. Cl.
CPC ...... *B41F 16/0026* (2013.01); *B41F 16/0033* (2013.01); *B41F 16/0046* (2013.01);
(Continued)

(58) Field of Classification Search
CPC ........................ B41F 16/0026; B41F 16/0046; B41F 16/003; B41F 16/008; B41F 16/0086;
(Continued)

(56) References Cited

U.S. PATENT DOCUMENTS 4,484,970 A * 11/1984 Burzlaff .................... B44C 1/14 156/289
5,456,169 A * 10/1995 Rohwetter .............. B41F 17/16 101/126
(Continued)

FOREIGN PATENT DOCUMENTS

CA 2155850 A1 8/1994
DE 41 32 476 A1 4/1993
(Continued)

OTHER PUBLICATIONS

Silicone (VMQ), Datasheet [online], Ames Rubber Manufacturing, 2014, Retrieved on Dec. 23, 2019 from http://www.amesrubberonline.com/pdf/silicone.pdf (Year: 2014).
(Continued)

*Primary Examiner* — Daniel McNally
(74) *Attorney, Agent, or Firm* — Lewis Roca Rothgerber Christie LLP

(57) ABSTRACT

The invention relates to a method and an apparatus for cold-stamping onto a three-dimensional object. In a first step, an adhesive is applied to the object at a first workstation. In a second step, a transfer film is pressed onto the object by a pressing device at a second workstation. At the same time, the adhesive is cured at the second workstation. As a result, the decorative material of the transfer film adheres to the object at the positions on the object which are provided with adhesive. If, following this, the transfer film is removed from the three-dimensional object after being pressed on, the decorative material remains on the object at the desired positions. At the positions at which in the first
(Continued)

step no adhesive has been applied to the object, the decorative material does not adhere to the object but rather remains on the carrier film of the transfer film.

20 Claims, 6 Drawing Sheets

(51) Int. Cl.
*B41F 19/00* (2006.01)
*B41F 23/00* (2006.01)
*B41F 23/04* (2006.01)

(52) U.S. Cl.
CPC ........ *B41F 16/008* (2013.01); *B41F 16/0086* (2013.01); *B41F 17/002* (2013.01); *B41F 19/001* (2013.01); *B41F 19/005* (2013.01); *B41F 23/005* (2013.01); *B41F 23/04* (2013.01); *Y10T 156/1028* (2015.01); *Y10T 156/1033* (2015.01)

(58) Field of Classification Search
CPC ...... B41F 17/002; B41F 23/005; B41F 23/04; B41F 19/001; B41F 19/005; Y10T 156/1033
See application file for complete search history.

(56) References Cited

U.S. PATENT DOCUMENTS

| | | | | |
|---|---|---|---|---|
| 2004/0219246 | A1* | 11/2004 | Jeans | B82Y 10/00 425/363 |
| 2005/0167035 | A1* | 8/2005 | Laskey | B41F 19/00 156/230 |
| 2006/0066703 | A1* | 3/2006 | Kadomatsu | B41J 11/007 347/102 |
| 2007/0070503 | A1* | 3/2007 | Boswell | B41F 11/02 359/566 |
| 2007/0119537 | A1* | 5/2007 | Bosshardt | B41F 16/0086 156/238 |
| 2010/0103235 | A1 | 4/2010 | Roof et al. | |
| 2010/0177151 | A1* | 7/2010 | Thompson | B41J 11/00214 347/102 |
| 2010/0212821 | A1* | 8/2010 | Grinberg | B32B 37/0046 156/247 |
| 2012/0199021 | A1 | 8/2012 | Till | |
| 2013/0048653 | A1 | 2/2013 | Boltshauser | |

FOREIGN PATENT DOCUMENTS

| | | | | | |
|---|---|---|---|---|---|
| DE | 197 19 331 | A1 | | 11/1998 | |
| EP | 1 803 564 | A2 | | 7/2007 | |
| FR | 2 865 965 | A1 | | 8/2005 | |
| JP | 53051254 | A | * | 5/1978 | |
| JP | 2009279868 | A | * | 12/2009 | |
| WO | WO-0234521 | A1 | * | 5/2002 | B41F 19/062 |
| WO | WO 03/020519 | A1 | | 3/2003 | |
| WO | WO 2005/077662 | A2 | | 8/2005 | |
| WO | WO 2011/116485 | A2 | | 9/2011 | |

OTHER PUBLICATIONS

German office action for Application No. 10 2012 112 556.2, dated Mar. 23, 2015 (4 pages) and partial English translation, p. 4.
International Search Report corresponding to PCT/EP2013/077200, dated Apr. 3, 2014, 4 pages.

* cited by examiner (i)

(ii)

METHOD AND APPARATUS FOR COLD-STAMPING ONTO THREE-DIMENSIONAL OBJECTS

CROSS-REFERENCE TO RELATED APPLICATION(S)

This application is a divisional of U.S. patent Ser. No. 14/652,976 filed Jun. 17, 2015, which claims priority to and the benefit of International Application Number PCT/EP2013/077200, filed Dec. 18, 2013, which claims priority to and benefit of German Application Number 10 2012 112 556.2, filed Dec. 18, 2012, the entire disclosures of which are incorporated herein by reference

FIELD

The present invention relates to a method and an apparatus for cold-stamping onto three-dimensional objects, in particular onto cylindrical, oval, rectangular, flat objects.

BACKGROUND

The hot-stamping method is known for decorating paper, labels, plastic materials and glass packages with decorative films, in particular with metallized films. In this case, a transfer or stamping film (e.g., a plastic carrier film with decorative material accommodated thereon, in particular with a metal layer) is coated with a hot-melt adhesive. In a hot-stamping machine, the adhesive layer is typically activated with pressure and temperature by a stamp die, so as to produce adhesion between the metal layer and the printed object. The carrier film is then removed.

In addition, the so-called cold-stamping method (also defined as cold-foiling) is provided for rolled goods and sheet goods (paper, films, labels). In this case, the adhesive is initially applied to the object in a printing process (offset printing or flexographic printing). The film is then laminated on and the adhesive layer is dried. As a result, the decorative material adheres to the pre-printed positions and the carrier film is removed with the remaining, non-adhering decorative material. The adhesive which is often used is one which cures under the effect of UV-radiation (UV-adhesive). The adhesive is then dried by UV-radiation through the film.

The cold-stamping method has a number of advantages over the hot-stamping method. Since no heating of the adhesive by a stamp die is required, there is no reduction in speed. As a result, a cold-stamping apparatus can be integrated into a printing machine; a separate production process is not required. Finally, lower tool costs are also achieved as a stamp die is not required.

However, cold-stamping onto three-dimensional objects, such as, e.g., glasses, bottles, pans, cans or tubes is not possible using the known methods. In the case of the known methods, the material to be provided with the film and the transfer film must be guided in parallel for a period of time after laminating, in order for the adhesive to be able to cure by exposure to UV-radiation. However, three-dimensional objects are slid, e.g., onto a holding device such as, e.g., a holding mandrel described in German utility model DE 20 2004 019 382 and are rotated thereby about the longitudinal axis during printing at different workstations. As a result, the object is accessible from all sides and it is possible to print on the entire surface of the object.

Printing on three-dimensional objects often takes place on so-called revolving transfer machines or linear transfer machines, in which at different workstations the object has different inks printed thereon or the surface of the object is treated in a different manner.

SUMMARY

Embodiments of the present invention permit cold-stamping onto three-dimensional, in particular cylindrical, oval, rectangular, flat objects, in particular on revolving transfer machines or linear transfer machines, in which the cold-stamping constitutes only a part of the working steps performed on the object.

In the case of a method in accordance with an embodiment of the invention for cold-stamping onto a three-dimensional object, the object is held by a holding device in such a manner as to be rotatable about an axis of rotation. In a first step, an adhesive is applied to the object at a first workstation. In a second step, a transfer film is pressed onto the object by a pressing device at a second workstation. At the same time, the adhesive is cured at the second workstation.

As a result, the decorative material of the transfer film adheres to the positions on the object which are provided with adhesive. If, following this, the transfer film is removed from the three-dimensional object after being pressed on, the decorative material remains on the object at the desired positions. At the positions at which in the first step no adhesive has been applied to the object, the decorative material does not adhere to the object but rather remains on the carrier film of the transfer film.

In one embodiment, the transfer film comprises the carrier film and a decorative material which can be released from the carrier film, wherein starting from the carrier film, the decorative material comprises a transparent release layer, an optional transparent protective lacquer layer, at least one decorative layer and at least one primer layer consisting of a thermoplastic adhesive, which can be activated in a temperature range of >90° C.

The transfer film comprises, in particular on its side facing away from the carrier film, a primer layer consisting of a thermoplastic adhesive, which in the case of cold film transfer acts as an adhesive-promoting layer to form a cold adhesive, in particular an adhesive which cross-links under the effect of UV-irradiation, on an object. Against expectation, it has been demonstrated that by combining a primer layer, which is arranged on the decorative material and consists of a thermoplastic adhesive, with a cold adhesive, in particular an adhesive which cross-links under the effect of UV-irradiation, which is arranged on the object, a particularly firm connection can be formed between the decorative material and the object and/or the primer layer. This is surprising in this respect since thermoplastic adhesives, which are also referred to as hot-melt adhesives, and cold adhesives, in particular adhesives which cross-link under the effect of UV-irradiation, are substances, of which the adhesive effects are based on completely different chemical-physical bases.

The decorative material which can be released from the carrier film in one embodiment comprises, starting from the carrier film, a transparent polymeric release layer which in a temperature range of 15° C. to 35° C. comprises a release force of the decorative material from the carrier film in the range of 15 cN to 35 cN, in particular in the range of 20 cN to 30 cN. The details regarding the release force relate to a film strip having a width of 15 cm.

In the case of a transfer film, the release force of the decorative material from the release layer or from the carrier film or the force required for breaking off regions of the decorative material under transfer conditions must be configured to be less in total than the adhesive force between the object and the decorative material which is influenced by the type of cold adhesive used and the connection thereof to the object on the one hand and to the primer layer on the other hand. Only then during transfer can the decorative material or regions thereof be released from the carrier film and remain adhered to the object. However, prior to the transfer the release force of the release layer from the carrier film must be sufficiently large as to ensure safe handling of the transfer film without the decorative material becoming detached from the carrier film, e.g., when unwinding the transfer film from a supply roll and/or when transporting the transfer film, optionally via deflection devices, to a cold film transfer unit. In order to be able to wind up and then unwind the transfer film, it has proven to be particularly useful to provide a suitable non-stick layer on the side of the carrier film facing away from the decorative material.

The release force describes the force (typically in the unit of force/length) which is to be applied in order to release two layers from one another; a positive correlation exists between the release force of a first layer from a second layer and the adhesion between the first layer and the second layer. The determination of the required release force between the carrier film and the decorative material of the transfer film in accordance with the invention was identified according to the FINAT test method no. 3 (FTM3, low speed release force). The release force has the unit N or cN, wherein the force is determined independently of the path but in relation to a film strip having a width of 15 cm.

In comparison with a conventional decorative material having a wax-based or silicone-based release layer, in the case of a decorative material having a polymeric release layer, release forces from the carrier film were measured which were up to 250%, in particular up to 150% higher. However, the decorative material was still sufficiently releasable and, in contrast to decorative materials of transfer films, which comprise wax-based or silicone-based release layers, could be overprinted very effectively, wherein extremely effective adhesion of the dried or cured printing ink on the decorative material could be achieved.

For the transfer film, in one embodiment if the release layer is formed to be free of wax and/or free of silicone. In particular, the transfer film does not comprise a conventional wax-based or silicone-based release layer, which hitherto meant that decorative materials of transfer films, which were equipped therewith, could have conventional printing inks, in particular UV-curing printing inks, UV-curing lacquers, hybrid inks or lacquers, printed thereon only to a limited extent or not at all.

The adhesion of printing inks on decorative material regions of the transfer film, which have been transferred onto the object by the method in accordance with the invention and by the apparatus in accordance with the invention was determined about an hour after printing by the following adhesive tape test at room temperature:

A test sample in the form of an object having a decorative material applied cold thereto and printing with decorative material at least on partial regions was arranged on a planar surface. A 13 cm to 16 cm long strip of adhesive tape 4104 was adhered thereto so that approximately 5 cm to 7 cm of the adhesive tape protruded beyond the edge of the object. The adhesive tape was then pressed three to four times by thumb and finally was removed from the test sample at an angle of >90°. The test was deemed to have been passed if 90% of the printing ink remained on the test sample or the test sample itself was torn.

Decorative material printing using conventional printing inks, in particular the aforementioned UV-curing printing inks, UV-curing lacquers, hybrid inks or lacquers, adhered excellently on the decorative material and therefore the test could be deemed to have been passed very well.

In embodiments, the release layer comprises a thickness in the range of 0.01 μm to 0.5 μm, for example, in the ranges of 0.01 μm to 0.3 μm, and more particularly 0.1 μm to 0.2 μm. This comparatively small thickness of the release layer allows the decorative material to be released from the transfer film in a sharply contoured and clean fashion. The accuracy and resolution which can be achieved thereby can correspond comparatively precisely to the layout of the cold adhesive layer which is applied partially, for example on the object, without deviating substantially therefrom, as a result of which it is possible to achieve a high degree of register accuracy of the cold film layout with respect to a possibly provided print layout consisting of conventional printing inks. In the case of this sharply contoured, partial release in accordance with the invention, the small thickness of the release layer produces only very small and very few so-called flakes, i.e., no layer residues of the decorative material of the transfer film which can be disruptive in subsequent process steps and/or can adversely affect the visual appearance of the coated object. By virtue of the comparatively small thickness of the release layer, it is possible to achieve resolutions which are below the aligning power of the human eye. What is likewise advantageous in the case of a thin release layer is the merely low release force which has to be applied when separating the layers during the partial transfer.

It has been proven to be successful if the at least one primer layer comprises a thickness in the range of 1 μm to 5 μm, in particular in the range of 1.5 μm to 3 μm.

Furthermore, the at least one primer layer can be formed so as to be dyed and/or matted, in order, e.g., to enhance an optical contrast with respect to the object or to improve or accelerate the initiation of the polymerisation of the UV-adhesive layer present below the primer layer, by a greater absorption possibility or even optical scattering power of the UV-radiation. Matting is to be understood to be the reduction in the transparency or radiolucency of the primer layer.

It has also proven to be successful if the at least one primer layer which is to adjoin the cold adhesive comprises a surface roughness in the range of 100 nm to 180 nm, in particular in the range of 120 nm to 160 nm. The surface roughness is determined inter alia by the application method and the formulation of the primer layer. It has been established that a lower surface roughness, but also surprisingly a higher surface roughness of the primer layer, leads to a reduction in the adhesion which can be achieved between a cold adhesive and the decorative material. The surface roughness of the primer layer has been determined by interference microscopy.

It is possible for not only one but also two or more primer layers to be present which differ in terms of their chemical and/or physical properties, in order to achieve on the one hand optimum adhesion in the direction of the adjoining decorative layer(s) and on the other hand optimum adhesion in the direction of the cold adhesive, in particular UV-adhesive, which comes into contact with the decorative material.

In one embodiment, the carrier film comprises a thickness in the range of 7 μm to 23 μm and may comprise polyester, polyolefin, polyvinyl, polyimide or ABS. The use of carrier films consisting of PET, PC, PP, PE, PVC or PS.

Overall, the transfer film comprises in particular a thickness in the range of 9 μm to 25 μm, in particular in the range of 13 μm to 16 μm.

It has proven to be successful if the decorative material comprises a protective lacquer layer. The protective lacquer layer provides in particular protection from mechanical and/or chemical stress of the decorative material on an object. In embodiments, the protective lacquer layer comprises a thickness in the range of 0.8 μm to 3 μm, in particular 0.9 μm to 1.3 μm, and can also be transparent or can be dyed or at least partially inked. Dyes and/or pigments can be used for dyeing purposes. Pigments can likewise be used in order to matt the protective lacquer layer, i.e., to reduce the transparency or radiolucency of the protective lacquer layer.

The at least one decorative layer of the decorative material can be formed by a metallic layer or a dielectric layer. It has proven to be successful if the at least one decorative layer comprises a thickness in the range of 8 nm to 500 nm. The metallic or dielectric layer can be dyed by additional, in particular transparent or translucent, color layers. Alternatively, the decorative layer can also comprise only one or a plurality of, in particular, transparent or translucent or opaque color layers without a metallic or dielectric layer. The color layers may have been applied in particular by printing methods. The printing methods for the color layer include all common printing methods (e.g. screen printing, flexographic printing, offset printing, digital printing). The decorative layer can comprise, as an alternative or in addition to metallic or dielectric layers or color layers, a lacquer having relief structures which are impressed, macroscopic, in particular refractively effective, or microscopic, in particular effective in terms of diffractive optics. These relief structures can be, e.g., refractive lens structures or prism structures or diffractively optical, i.e., diffractive grid structures such as, e.g., a hologram, a KINEGRAM®. The relief structures can also be isotropically or anisotropically scattering matt structures or regularly or irregularly constructed anti-reflection structures. Macroscopic relief structures comprise approximate sizes (structure period, structure depth) of about 1 μm to about 1000 μm. Macroscopic relief structures comprise approximate sizes (structure period, structure depth) of about 10 nm to about 100 μm.

In one embodiment, the dielectric layer is formed in particular at least from a material of the group comprising metal oxide, polymer or lacquer. A dielectric layer consisting of HRI material (HRI=High Refractive Index), such as $SiO_x$, MgO, $TiO_x$, $Al_2O_3$, ZnO, ZnS, has proven to be particularly successful. The variable x is in the range of 0 to 3, i.e., x=0, 1, 2, 3.

The decorative layer can be formed in particular also from an HRI material which is transmissible in the UV wavelength range, such as CdSe, CeTe, Ge, $HfO_2$, PbTe, Si, Te, TiCl or ZnTe.

The metallic or dielectric layer can be used as a reflection layer for the aforementioned relief structures and in particular can be applied, in particular vapour-deposited, directly on the relief structures and thus follow the surface form of the relief structure formed therein.

The decorative layer can comprise the mentioned dielectric, metallic or color layers in each case over the entire surface and in a uniformly applied layer thickness. As an alternative thereto, individual ones or all of these dielectric, metallic or color layers can also be partially applied and can form in particular a motif. The motif can be composed of partial surface portions of the individual layers, wherein the individual layers can be formed next to one another and/or so as to overlap. In particular, it is possible to apply the individual layers in the form of a grid, in order to produce a true color image, e.g., with three or four colors (e.g. as CMY- or CMYK grid; C=Cyan, M=Magenta, Y=Yellow, K=Black). The individual dots of the color layers are provided next to one another and/or one on top of the other. The color layers can also contain pigments or dyes which are metallic and/or optically variable, i.e., dependent upon the viewing angle. The color layers can also contain fluorescent and/or phosphorescent dyes.

If the decorative layer comprises a motif, it is advantageous to apply the motif in a desired position, in particular in a positionally accurate manner onto the object. The positional accuracy is also defined as register accuracy. For this purpose, the decorative layer may comprise in its edge region register marks which can be read out in particular optically by correspondingly arranged sensors. On the basis of the sensor measurement values, the feeding or positioning of the transfer film can be controlled, e.g., by servomotors such that in each case a motif is positioned on the transfer film with register accuracy with respect to a likewise correspondingly adjusted position of the object and subsequently the carrier film is pressed against the object. The desired register accuracy is about ±1 mm, particularly ±0.5 mm, and more particularly <=±0.3 mm.

In an alternative embodiment, the transfer film comprises a carrier film and a particularly transparent stamping lacquer layer applied thereto, wherein one or a plurality of the aforementioned relief structures are impressed into this stamping lacquer layer. The stamping lacquer layer having the relief structures may be an outer layer of the transfer film, wherein the relief structures are impressed on the side of the stamping lacquer layer facing away from the carrier film. A very thin non-stick layer (thinner than 1 μm) can be applied on the stamping lacquer layer. In this alternative embodiment, a release layer is not located between the stamping lacquer layer and the carrier film. The stamping lacquer layer is a UV-cured or electron beam-cured lacquer layer.

Alternatively, the relief structures can also be impressed directly in the carrier film, without using an additional stamping lacquer layer. A very thin non-stick layer (e.g., thinner than 1 μm) can also be applied on the relief structures.

In the case of this alternative embodiment, the object is held by the holding device in such a manner as to be rotatable about an axis of rotation. In a first step, an adhesive is applied to the object at a first workstation. In a second step, a transfer film is pressed onto the object by a pressing device at a second workstation. At the same time, the adhesive is cured at the second workstation. As a result, the relief structure of the stamping lacquer layer is pressed into the adhesive and is then present at this location as a counterpart of this relief structure. At the positions at which in the first step no adhesive has been applied to the object, a relief structure is not impressed onto the object. Following this, the transfer film is removed from the object completely, i.e., together with the stamping lacquer layer arranged completely on the carrier film, only the relief structure formed in the adhesive remaining on the object. In one embodiment, additional UV-irradiation can be conducted after removal of the transfer film in order to achieve particularly effective curing of the adhesive. The relief structure is optically effective by virtue of the optical boundary layer of air/adhesive with the corresponding difference in the refractive index of the two media (e.g. adhesive about 1.5; air about 1.0). The optical efficiency can be increased if the background comprises a high absorption capacity in the visible wavelength range, i.e., is dark in color, in particular black.

In the case of this alternative embodiment, the transfer film can be used a number of times, i.e., in a plurality of independent method passes, the transfer film is pressed onto a plurality of objects and then removed therefrom. The material of the stamping lacquer layer on the transfer film or alternatively the material of the transfer film itself is selected in particular such that after release of the transfer film from the adhesive, no adhesive or only the smallest parts thereof remain adhered to the stamping lacquer layer or the transfer film and foul or partially fill the relief structure. In other words, in one embodiment the adhesion between the relief structure and adhesive is as low as possible.

The holding device can be, e.g., a holding mandrel, onto which the object is slid. The object is then held exclusively from the inside by friction of the holding mandrel with the inner surface of the object. Alternatively, the holding device can also hold the object from the outside if the entire surface of the object is not to be printed on or coated.

In one embodiment of the method, the transfer film is pressed onto the object by virtue of the fact that the object is rotated about the axis of rotation, the transfer film is guided tangentially with respect to the outer periphery of the object and the pressing device presses the transfer film onto the object along the contact line between the object and transfer film. By rotating the object through 360° about the axis of rotation, the decorative material can thus be applied to the object at all positions.

In a further embodiment of the method, the pressing device is moved such that the surface speed of the pressing device corresponds to the surface speed of the object. Moreover, the transfer film is moved such that the surface speed of the transfer film corresponds to the surface speed of the object. This ensures that the pressing device, transfer film and object do not rub against one another. This prevents the adhesive from being smeared on the object. Likewise, the risk of damage being caused to the transfer film or the object decreases.

In a further embodiment of the method, the pressing device comprises a cylinder which is rotatable about the cylinder axis. The transfer film can be pressed onto the object by virtue of the fact that the transfer film is guided between the cylinder and the object when the cylinder rotates about the cylinder axis and the object rotates about the axis of rotation at the same time.

Alternatively, the transfer film can be pressed onto flat objects by virtue of the fact that the cylinder is guided linearly over the stationary object when the cylinder rotates at the same time about the cylinder axis.

In a further embodiment of the method, the pressing device comprises a plate. In this case, the transfer film can be guided directly along the plate and can thereby be pressed against the object.

In a further preferred embodiment of the method, the adhesive is a UV-adhesive, i.e., an adhesive which can be polymerized and thus cures when energy is applied thereto by ultraviolet (UV) radiation. The UV-radiation sources which can be used include, e.g., mercury vapour lamps, e.g., high-pressure mercury vapour lamps, doped high-pressure mercury vapour lamps, carbon arc lamps, xenon arc lamps, metal halide lamps, UV-lasers or UV-light-emitting diodes. Alternatively, electron beam-curing can also be conducted.

The duration for which the adhesive is irradiated by UV-radiation when the transfer film is being pressed on is in the region of less than one second. The duration for which the adhesive is irradiated by UV-radiation after the carrier film has been removed from the applied decorative material may be in the range of about 0.005 s to about 0.05 s, particularly about 0.015 s for 5 mm reference length with a UV-LED with a radiation power of 5 $W/cm^2$ to 20 $W/cm^2$, more particularly a maximum of 16 $W/cm^2$ and a power adjustment between 40% and 100%.

As an alternative to an application of the cold adhesive, in particular the adhesive which cross-links under the effect of UV-irradiation, to the object, it is of course possible to apply cold adhesive also or in addition to the at least one primer layer of the transfer film.

It has proven to be successful if the cold adhesive, in particular the adhesives or UV-adhesives which cross-link under the effect of UV-irradiation, is applied to the object in an application quantity in the range of 1 $g/m^2$ to 3 $g/m^2$. The quantity of cold adhesive can be varied depending upon the absorptive capacity of the object used, wherein objects which are not very absorbent and/or are free of open pores have in particular cold adhesive quantities in the range of 1 $g/m^2$ bis 2 $g/m^2$ applied thereto and more absorbent and/or open-pored objects have in particular cold adhesive quantities in the range of 2 $g/m^2$ bis 3 $g/m^2$ applied thereto. The adhesive or cold adhesive which is used can also be a lacquer which adheres sufficiently on the object and subsequently to the decorative material, in particular a clear or colored and thus transparent, translucent or opaque screen printing lacquer or flexographic printing lacquer. If the adhesive is applied as a transparent, translucent or opaque colored layer, a plurality of adhesives can also be used in different colors and/or grey scales, in order to thereby form, e.g., a multicolored motif in the form of a symbol, logo, emblem, letters or numbers, i.e., the motif can be composed of partial surface portions of the individual colors and/or grey scales, wherein the surface portions can be arranged next to one another and/or so as to overlap. The individual color(s) and/or grey scale(s) can also be applied in a rasterized manner, i.e., it is possible to apply the individual colors and/or grey scales in the form of a grid, in order to produce a true color image, e.g., with three or four colors (e.g. as a CMY- or CMYK-grid; C=Cyan, M=Magenta, Y=Yellow, K=Black). The individual dots of the color layers are provided next to one another and/or one on top of the other.

In one embodiment, a radiation having a wavelength in the range of 250 nm to 420 nm is used as the UV-radiation in order to irradiate the adhesive which cross-links under the effect of UV-irradiation, or the radiation used comprises an intensity maximum in this wavelength range. An LED-UV unit having a wavelength in the range of 380 nm to 420 nm, particularly 380 nm to 400 nm, may be used.

The UV-cross-linking adhesive used comprises in particular the following viscosities, as measured with the Rheometer MCR 101 measuring device from the company Physica (measuring cone: CP25-1/Q1; measuring temperature: 20° C.): Viscosity at a shear rate of 25 1/s: particularly 120 to 220 Pas, more particularly 180 Pas Viscosity at a shear rate of 100 1/s: particularly 40 to 90 Pas, more particularly 80 Pas Furthermore, the UV-cross-linking adhesive used comprises a tack value in the range of 18 to 25, in particular 22. The “tack” or the so-called “initial adhesion” is determined in one embodiment by the Inkomat 90T/600 measuring device from the company Prüfbau. The following measuring conditions were selected:

UV-adhesive quantity: 1 g
Roller speed: 100 m/min
Measuring temperature: 20° C.
Measuring duration: 2 min.

In particular, adhesive tape-like adhesion (adhesive tape test, see above) is achieved between the decorative material of the transfer film and the object, wherein, when using a conventionally drying cold adhesive, the adhesive tape test could be deemed to have been passed even after a few minutes and when a UV-adhesive is used the adhesive tape test could be deemed to have been passed immediately after irradiation with UV-radiation. More than 90% of the decorative material remained on the object.

In particular, it has proven to be successful if the transfer film, optionally also only the decorative material thereof, has a transmittance in the range of 5% to 70%, in particular in the range of 20% to 40%, for UV-radiation in the wavelength range of 250 nm to 420 nm, particularly in the range of 380 nm to 420 nm, more particularly 380 nm to 400 nm. This permits particularly rapid and in particular complete curing of a cold adhesive on the basis of an adhesive, which cross-links under the effect of UV-irradiation, on the object, thus further improving the adhesion of the decorative material to the object. The reason for this is that only when the amount of irradiation is sufficiently high is the adhesive, which cross-links under the effect of UV-irradiation, is completely cross-linked and cured, and achieves a high adhesive force so as to prevent the decorative material regions transferred onto the object being released from the object. In this case, the UV-transmittance of a transfer film is determined by the layer of a transfer film which has the lowest UV-transmittance of all of the layers present.

When using a UV-adhesive as a cold adhesive, in order to achieve the desired high UV-transmittance of the transfer film also in the case of a decorative layer in the form of a metallic layer, the metallic layer may comprise merely a layer thickness in the range of 8 nm to 15 nm, particularly in the range of 10 nm to 12 nm. It is also possible for the metallic layer to comprise a layer thickness in the range of 12 nm to 15 nm. In this way, high visibility and a decorative effect of the metallic layer in combination with a high UV-radiation transmittance are achieved (optical density (OD) about 1.2). In the case of conventional transfer films, metal layers having a thickness in the region of more than 15 nm are typically used in order to achieve optimum brilliance. However, by reason of the resulting high optical density of approximately 2, such conventional metal layers are not sufficiently UV-transmissive for use of a UV-adhesive as a cold adhesive.

It has proven to be successful if the metallic layer is formed from aluminium, silver, gold, copper, nickel, chromium or an alloy comprising at least two of these metals.

If the decorative layer comprises further color layers in addition to or as an alternative to the metallic layer, it is advantageous if overall the decorative layer does not exceed an optical density of approximately 1.2, in order to achieve a sufficient UV-transmittance.

In a further embodiment of the method, the pressing device is transparent to UV-radiation at least in partial regions. This renders it possible for the pressing device to be arranged between a UV-radiation source, which generates the UV-radiation, and the holding device.

For example, the UV-radiation source can be arranged within a cylinder of the pressing device. For this purpose, the cylinder is designed as a hollow cylinder at least in places. The material of the cylinder is selected such that the wavelengths of the UV-radiation required for curing the adhesive can be transmitted through the cylinder. The cylinder can be completely transparent for UV-radiation; however, transparent windows can also be provided in the cylinder so that UV-radiation only exits the cylinder when specifically the UV-radiation is required for curing the adhesive.

In one embodiment, the region of the object which is to be exposed to UV-radiation can be adjusted so that the curing of the UV-adhesive is so far advanced when the transfer film is pressed onto the adhesive that the decorative layer of the transfer film adheres to the object and can be detached from the carrier film. For this purpose, depending upon the adhesive used and upon the intensity of the UV-radiation, it may be necessary to expose the adhesive on the object to radiation even in advance of the contact line between the object and the transfer film. The region to be exposed to radiation can be adjusted, e.g., by (optionally adjustable or changeable) apertures between the UV-radiation source and the object. One or a plurality of apertures can also be attached directly to the pressing device. The adjustment can also be effected by adjusting the divergence of the UV-radiation emitted by the UV-radiation source. In a further preferred embodiment of the method, the pressing device further comprises a flexible pressing layer on the holding device. In this way, it is possible to compensate for any irregularities in the three-dimensional object, the transfer film and/or the mechanical structure. The flexible pressing layer can consist, e.g., of silicone.

Furthermore, in order to increase the resistance to external mechanical, chemical or thermal influences of the decorative material of the carrier film applied to the object, it is advantageous to expose the applied decorative material once again to UV-radiation after the carrier film on the object has been removed, in order to sufficiently cure the adhesive arranged underneath the decorative material and thus increase the adhesion of the decorative material on the object. For this purpose, an additional UV-radiation source can be provided or the UV-radiation source can be adjusted accordingly, e.g., by (optionally adjustable or changeable) apertures. The adjustment can also be effected by adjusting the divergence of the UV-radiation emitted by the UV-radiation source.

If sufficient curing of the adhesive is achieved and the adhesion of the decorative material on the object is sufficiently good, then it is possible in further workstations to provide an additional coating on the object in the region of the decorative material and/or in regions adjacent thereto or on the entire surface thereof. A coating can be effected, e.g., by one or a plurality of additionally applied, transparent, translucent or opaque lacquer layers, in order to improve the resistance of the object and/or the decorative material and/or to change the visual impression of the object and/or of the decorative material. This additional coating can be effected by printing units arranged downstream, e.g., screen printing units or flexographic printing units. Coating the decorative material with a metallically reflective layer can be effected, e.g., by translucent inks for achieving a particularly colored metallic effect. Coating the decorative material can be effected, e.g., by transparent relief lacquers for optically visible and/or tactually perceivable 3D-effects.

In one embodiment, the first workstation for applying the adhesive, the second workstation for pressing the transfer film and all further workstations are arranged in-line, i.e., that processing is effected without interruption. In one embodiment, the object remains on the holding device in all of the workstations and passes together with the holding device through all of the workstations. As a result, a high level of register accuracy with low bearing tolerance can be achieved between the decorative material and the subsequently applied coating, since the object does not leave the holding apparatus during the entire process and is reliably fixed on the holding apparatus.

As a result, it is likewise possible to print coatings on the object, in particular by screen printing, flexographic printing or digital printing, even prior to application of the decorative material on the object. These previous coatings can be formed as transparent, translucent or opaque layers. The decorative material can be applied subsequently, as mentioned above, in an advantageous manner with register accuracy with respect to the previously applied coatings. In particular, the combination of the previous coating, subsequently applied decorative material and subsequent repeated coating permits a multiplicity of optical effects and designs.

In a further embodiment of the method, the pressing layer is transparent to UV-radiation at least in partial regions. The regions in which the pressing layer is transparent can be oriented to the regions in which the holding device is transparent. However, the pressing layer can also be completely transparent, whereas the holding device is only transparent in places.

In a further embodiment of the method, the first workstation is a flexographic printing station. The adhesive can then be applied to the three-dimensional object by a printing plate attached to the printing block cylinder. Alternatively, the first workstation can also be a screen printing station or a digital printing station (e.g. ink jet).

The invention also relates to an apparatus for cold-stamping onto a three-dimensional object. An apparatus in accordance with an embodiment of the invention comprises a holding device, with which the object can be held so as to be rotatable about an axis of rotation. The apparatus also comprises a first workstation having a printing station, at which the adhesive can be applied to the object. The apparatus also comprises a second workstation having a pressing device for pressing a transfer film onto the object and having a curing device for curing the adhesive. The second workstation is arranged in such a manner that pressing of the transfer film and curing of the adhesive can be effected simultaneously.

In an embodiment of the apparatus, the apparatus comprises a transfer film guide which is configured so as to guide the transfer film tangentially with respect to the outer periphery of the object. The pressing device is arranged in such a manner that it presses the transfer film onto the object along the contact line between the object and transfer film. By rotating the object through 360° about the axis of rotation, the decorative material can thus be applied to the object at all positions.

In a further embodiment of the apparatus, the pressing device can be moved such that the surface speed of the pressing device can be adapted to the surface speed of the object. Moreover, the transfer film can be moved such that the surface speed of the transfer film can be adapted to the surface speed of the object. This ensures that the pressing device, transfer film and object do not rub against one another, i.e., do not comprise any slippage. This prevents the adhesive from being smeared on the object. Likewise, the risk of damage being caused to the transfer film or the object decreases.

In a further embodiment of the apparatus, the pressing device comprises a cylinder which is rotatable about the cylinder axis. The transfer film can be pressed onto the object by virtue of the fact that the transfer film is guided between the cylinder and the object when the cylinder rotates about the cylinder axis and the object rotates about the axis of rotation at the same time.

Alternatively, the transfer film can be pressed onto flat objects by virtue of the fact that the cylinder is guided linearly over the stationary object when the cylinder rotates at the same time about the cylinder axis.

In a further embodiment of the apparatus, the pressing device comprises a plate. In this case, the transfer film can be guided directly along the plate and can thereby be pressed against the object.

In a further embodiment of the apparatus, the adhesive is a UV-adhesive. The curing device then comprises a UV-radiation source for curing the adhesive. The UV-radiation sources which can be used include, e.g., mercury vapour lamps, UV-lasers or UV-light-emitting diodes.

In a further embodiment of the apparatus, the pressing device is transparent to UV-radiation at least in partial regions. This renders it possible for the pressing device to be arranged between the UV-radiation source, which generates the UV-radiation, and the holding device.

For example, the UV-radiation source can be arranged within a cylinder of the pressing device. For this purpose, the cylinder is designed as a hollow cylinder at least in places. The material of the cylinder is selected such that the wavelengths of the UV-radiation required for curing the adhesive can be transmitted through the cylinder. The cylinder can be completely transparent for UV-radiation; however, transparent windows can also be provided in the cylinder so that UV-radiation only exits the cylinder when as governed by the method UV-radiation is required for curing the adhesive.

In one embodiment, the region of the object which is to be exposed to UV-radiation can be adjusted so that the curing of the UV-adhesive is so far advanced when the transfer film is pressed onto the adhesive that the decorative layer of the transfer film adheres to the object and can be detached from the carrier film. For this purpose, depending upon the adhesive used and upon the intensity of the UV-radiation, it may be necessary to expose the adhesive on the object to radiation even in advance of the contact line between the object and the transfer film. The region to be exposed to radiation can be adjusted, e.g., by (optionally adjustable or changeable) apertures between the UV-radiation source and the object. One or a plurality of apertures can also be attached directly to the pressing device. The adjustment can also be effected by adjusting the divergence of the UV-radiation emitted by the UV-radiation source.

In a further embodiment of the apparatus, the pressing device further comprises a flexible pressing layer on the holding device. In this way, it is possible to compensate for any irregularities in the three-dimensional object, the transfer film and/or the mechanical structure. The flexible pressing layer can comprise, e.g., silicone.

In a further embodiment of the apparatus, the pressing layer is transparent to UV-radiation at least in partial regions. The regions in which the pressing layer is transparent can be oriented to the regions in which the holding device is transparent. However, the pressing layer can also be completely transparent, whereas the holding device is only transparent in places.

In one embodiment, the pressing device and/or the pressing layer is/are transparent or translucent to UV-radiation in the wavelength range of 250 nm to 420 nm, particularly in the range of 380 nm to 420 nm, more particularly 380 nm to 400 nm. The transparency or translucency should be in particular 30% to 100%, more particularly 40% to 100%. The transparency or translucency is dependent upon the thickness of the pressing layer. A lower transparency or translucency can be compensated for by a higher UV-intensity.

In one embodiment, the pressing device and/or the pressing layer includes silicone and has a thickness in the range of 1 mm to 20 mm, particularly 3 mm to 10 mm in the region to be penetrated by UV-radiation. The silicone may have a hardness of 30° Shore A to 70° Shore A, particularly 35° Shore A to 50° Shore A. The silicone can be a hot vulcanizate or cold vulcanizate.

The shape of the pressing layer can be formed to be flat or three-dimensional (a three-dimensionally curved or bent contour with a smooth or structured/textured surface). Flat pressing layers are particularly suitable for stamping cylindrical geometries and three-dimensionally formed pressing layers are particularly suitable for non-circular, oval or angular geometries. A structured and/or textured surface of the pressing layer can also be advantageous in order to also transfer this structure and/or texture in an overlying manner onto the surface of the object during transfer of the decorative material. The structure and/or texture can be an endless pattern or an endless motif or even an individual pattern and/or motif or a combination thereof.

It has been demonstrated in particular in series of tests that the surface of a silicone surface of the pressing layer can be adhesive for the transfer film to be processed. The surface roughness (average roughness) of such an adhesive surface is from experience less than ca. 0.5 μm, in particular between 0.06 μm and 0.5 μm, more particularly between approximately 0.1 μm and 0.5 μm. In the case of such an adhesive surface, it is advantageous if an intermediate film consisting particularly of PET is provided between the pressing layer and the transfer film. The intermediate film reduces the adhesivity of the pressing layer and facilitates the processing of the transfer film considerably because the transfer film no longer remains adhered in a disruptive manner on the surface of the pressing layer. The thickness of the intermediate film increases the effective hardness of the equalization effect of the silicone die. Some exemplified embodiments are provided hereinafter:

A 5 mm thick pressing layer consisting of silicone (49° Shore A) with a 15 μm thick PET-film produces 73° Shore A (corresponds to a 49% increase).

A 5 mm thick pressing layer consisting of silicone (49° Shore A) with a 50 μm thick PET-film produces 85° Shore A (corresponds to a 70% increase).

A 10 mm thick pressing layer consisting of silicone (47° Shore A) with a 15 μm thick PET-film produces 71° Shore A (corresponds to a 51% increase).

A 10 mm thick pressing layer consisting of silicone (47° Shore A) with a 50 μm thick PET-film produces 78° Shore A (corresponds to a 59% increase).

In the case of these values, it is necessary to take into consideration that as far as the definition of the measuring requirements for Shore A measuring methods is concerned, the measurement of the sandwich of the pressing layer and film is actually no longer valid. The Shore-A measuring method measures a penetration depth of a test body between 0 mm and 2.5 mm and prescribes a minimum thickness of the test sample of 6 mm. Therefore, the film in conjunction with the Shore-A measuring method gives the wrong impression that a greater hardness exists than is actually the case. It is not possible to infer the actual/effective hardness from the measurement value. It can merely be stated that the effective hardness of the sandwich is greater than the hardness of the silicone die and the film dominates and defines the overall hardness of the sandwich irrespective of the thickness of the silicone layer.

In one embodiment, the pressing layer is provided with a non-adhesive surface and therefore it is possible to dispense with the use of an intermediate film. In this case, the overall arrangement is softer so that as a consequence a smaller pressing force is sufficient for pressing the object onto the pressing layer. The surface roughness (average roughness) of such a non-adhesive surface is from experience more than about 0.5 μm, in particular between 0.5 μm and 1 μm, more particularly between approximately 0.6 μm and 7 μm, and more particularly between 0.8 μm and 3 μm.

The pressing device or the pressing layer ensures that the object rolls safely and uniformly under defined conditions and in this case compensates for any shape or movement tolerances thereof. The pressing device or the pressing layer has, e.g., in the case of objects including plastic material, only a slight contact pressing force, as otherwise the objects will be deformed, in the case of objects consisting of harder or more resistant materials such as, e.g., glass, porcelain or ceramic, somewhat greater contact pressing forces are advantageous as a result of greater shape tolerances and/or greater mechanical stability of the object. The contact pressing force is approximately 1 N to 1000 N. For example, the contact pressing force for objects including plastic material can be approximately 50 N to 200 N and for objects consisting of glass, porcelain or ceramic the contact pressing force can be approximately 75 N to 300 N. In order to additionally prevent deformations of plastic material parts, e.g., the object to be decorated can be filled with compressed air during the stamping procedure in a correspondingly designed holding device.

In a further embodiment of the apparatus, the first workstation is a flexographic printing station. The adhesive can then be applied to the three-dimensional object by a printing plate attached to the printing block cylinder. Alternatively, the first workstation can also be a screen printing station ora digital printing station (e.g. ink jet).

The invention also relates to an apparatus for cold-stamping onto a three-dimensional object. An apparatus in accordance with an embodiment of the invention comprises a holding device, with which the object can be held so as to be rotatable about an axis of rotation. The apparatus also comprises a first workstation having a printing station, at which the adhesive can be applied to the object. The apparatus also comprises a second workstation having a pressing device for pressing a transfer film onto the object and having a curing device for curing the adhesive. The second workstation is arranged in such a manner that pressing of the transfer film and curing of the adhesive can be effected simultaneously.

In an embodiment of the apparatus, the apparatus comprises a transfer film guide which is configured so as to guide the transfer film tangentially with respect to the outer periphery of the object. The pressing device is arranged in such a manner that it presses the transfer film onto the object along the contact line between the object and transfer film. By rotating the object through 360° about the axis of rotation, the decorative material can thus be applied to the object at all positions.

In a further embodiment of the apparatus, the pressing device can be moved such that the surface speed of the pressing device can be adapted to the surface speed of the object. Moreover, the transfer film can be moved such that the surface speed of the transfer film can be adapted to the surface speed of the object. This ensures that the pressing device, transfer film and object do not rub against one another, i.e., do not comprise any slippage. This prevents the adhesive from being smeared on the object. Likewise, the risk of damage being caused to the transfer film or the object decreases.

In a further embodiment of the apparatus, the pressing device comprises a cylinder which is rotatable about the cylinder axis. The transfer film can be pressed onto the object by virtue of the fact that the transfer film is guided between the cylinder and the object when the cylinder rotates about the cylinder axis and the object rotates about the axis of rotation at the same time.

Alternatively, the transfer film can be pressed onto flat objects by virtue of the fact that the cylinder is guided linearly over the stationary object when the cylinder rotates at the same time about the cylinder axis.

In a further embodiment of the apparatus, the pressing device comprises a plate. In this case, the transfer film can be guided directly along the plate and can thereby be pressed against the object.

In a further embodiment of the apparatus, the adhesive is a UV-adhesive. The curing device then comprises a UV-radiation source for curing the adhesive. The UV-radiation sources which can be used include, e.g., mercury vapour lamps, UV-lasers or UV-light-emitting diodes.

In a further embodiment of the apparatus, the pressing device is transparent to UV-radiation at least in partial regions. This renders it possible for the pressing device to be arranged between the UV-radiation source, which generates the UV-radiation, and the holding device.

For example, the UV-radiation source can be arranged within a cylinder of the pressing device. For this purpose, the cylinder is designed as a hollow cylinder at least in places. The material of the cylinder is selected such that the wavelengths of the UV-radiation required for curing the adhesive can be transmitted through the cylinder. The cylinder can be completely transparent for UV-radiation; however, transparent windows can also be provided in the cylinder so that UV-radiation only exits the cylinder when as governed by the method UV-radiation is required for curing the adhesive.

In one embodiment, the region of the object which is to be exposed to UV-radiation can be adjusted so that the curing of the UV-adhesive is so far advanced when the transfer film is pressed onto the adhesive that the decorative layer of the transfer film adheres to the object and can be detached from the carrier film. For this purpose, depending upon the adhesive used and upon the intensity of the UV-radiation, it may be necessary to expose the adhesive on the object to radiation even in advance of the contact line between the object and the transfer film. The region to be exposed to radiation can be adjusted, e.g., by (optionally adjustable or changeable) apertures between the UV-radiation source and the object. One or a plurality of apertures can also be attached directly to the pressing device. The adjustment can also be effected by adjusting the divergence of the UV-radiation emitted by the UV-radiation source.

In a further embodiment of the apparatus, the pressing device further comprises a flexible pressing layer on the holding device. In this way, it is possible to compensate for any irregularities in the three-dimensional object, the transfer film and/or the mechanical structure. The flexible pressing layer can comprise, e.g., silicone.

In a further embodiment of the apparatus, the pressing layer is transparent to UV-radiation at least in partial regions. The regions in which the pressing layer is transparent can be oriented to the regions in which the holding device is transparent. However, the pressing layer can also be completely transparent, whereas the holding device is only transparent in places.

In one embodiment, the pressing device and/or the pressing layer is/are transparent or translucent to UV-radiation in the wavelength range of 250 nm to 420 nm, particularly in the range of 380 nm to 420 nm, more particularly 380 nm to 400 nm. The transparency or translucency should be in particular 30% to 100%, more particularly 40% to 100%. The transparency or translucency is dependent upon the thickness of the pressing layer. A lower transparency or translucency can be compensated for by a higher UV-intensity.

In one embodiment, the pressing device and/or the pressing layer includes silicone and has a thickness in the range of 1 mm to 20 mm, particularly 3 mm to 10 mm in the region to be penetrated by UV-radiation. The silicone may have a hardness of 30° Shore A to 70° Shore A, particularly 35° Shore A to 50° Shore A. The silicone can be a hot vulcanizate or cold vulcanizate.

The shape of the pressing layer can be formed to be flat or three-dimensional (a three-dimensionally curved or bent contour with a smooth or structured/textured surface). Flat pressing layers are particularly suitable for stamping cylindrical geometries and three-dimensionally formed pressing layers are particularly suitable for non-circular, oval or angular geometries. A structured and/or textured surface of the pressing layer can also be advantageous in order to also transfer this structure and/or texture in an overlying manner onto the surface of the object during transfer of the decorative material. The structure and/or texture can be an endless pattern or an endless motif or even an individual pattern and/or motif or a combination thereof.

It has been demonstrated in particular in series of tests that the surface of a silicone surface of the pressing layer can be adhesive for the transfer film to be processed. The surface roughness (average roughness) of such an adhesive surface is from experience less than ca. 0.5 μm, in particular between 0.06 μm and 0.5 μm, more particularly between approximately 0.1 μm and 0.5 μm. In the case of such an adhesive surface, it is advantageous if an intermediate film consisting particularly of PET is provided between the pressing layer and the transfer film. The intermediate film reduces the adhesivity of the pressing layer and facilitates the processing of the transfer film considerably because the transfer film no longer remains adhered in a disruptive manner on the surface of the pressing layer. The thickness of the intermediate film increases the effective hardness of the equalization effect of the silicone die. Some exemplified embodiments are provided hereinafter:

- A 5 mm thick pressing layer consisting of silicone (49° Shore A) with a 15 μm thick PET-film produces 73° Shore A (corresponds to a 49% increase).
- A 5 mm thick pressing layer consisting of silicone (49° Shore A) with a 50 μm thick PET-film produces 85° Shore A (corresponds to a 70% increase).
- A 10 mm thick pressing layer consisting of silicone (47° Shore A) with a 15 μm thick PET-film produces 71° Shore A (corresponds to a 51% increase).
- A 10 mm thick pressing layer consisting of silicone (47° Shore A) with a 50 μm thick PET-film produces 78° Shore A (corresponds to a 59% increase).

In the case of these values, it is necessary to take into consideration that as far as the definition of the measuring requirements for Shore A measuring methods is concerned, the measurement of the sandwich of the pressing layer and film is actually no longer valid. The Shore-A measuring method measures a penetration depth of a test body between 0 mm and 2.5 mm and prescribes a minimum thickness of the test sample of 6 mm. Therefore, the film in conjunction with the Shore-A measuring method gives the wrong impression that a greater hardness exists than is actually the case. It is not possible to infer the actual/effective hardness from the measurement value. It can merely be stated that the effective hardness of the sandwich is greater than the hardness of the silicone die and the film dominates and defines the overall hardness of the sandwich irrespective of the thickness of the silicone layer.

In one embodiment, the pressing layer is provided with a non-adhesive surface and therefore it is possible to dispense with the use of an intermediate film. In this case, the overall arrangement is softer so that as a consequence a smaller pressing force is sufficient for pressing the object onto the pressing layer. The surface roughness (average roughness) of such a non-adhesive surface is from experience more than about 0.5 μm, in particular between 0.5 μm and 1 μm, more particularly between approximately 0.6 μm and 7 μm, and more particularly between 0.8 μm and 3 μm.

The pressing device or the pressing layer ensures that the object rolls safely and uniformly under defined conditions and in this case compensates for any shape or movement tolerances thereof. The pressing device or the pressing layer has, e.g., in the case of objects including plastic material, only a slight contact pressing force, as otherwise the objects will be deformed, in the case of objects consisting of harder or more resistant materials such as, e.g., glass, porcelain or ceramic, somewhat greater contact pressing forces are advantageous as a result of greater shape tolerances and/or greater mechanical stability of the object. The contact pressing force is approximately 1 N to 1000 N. For example, the contact pressing force for objects including plastic material can be approximately 50 N to 200 N and for objects consisting of glass, porcelain or ceramic the contact pressing force can be approximately 75 N to 300 N. In order to additionally prevent deformations of plastic material parts, e.g., the object to be decorated can be filled with compressed air during the stamping procedure in a correspondingly designed holding device.

In a further embodiment of the apparatus, the first workstation is a flexographic printing station. The adhesive can then be applied to the three-dimensional object by a printing plate attached to the printing block cylinder. Alternatively, the first workstation can also be a screen printing station or a digital printing station (e.g. ink jet).

BRIEF DESCRIPTION OF THE DRAWINGS

The invention will be explained in detail hereinafter with reference to the drawings, in which:

FIG. 1*a* shows a first workstation 1 which is designed as a flexographic printing station. Mounted on a printing block cylinder 11 is a printing plate 12, which determines the motif in which the adhesive is to be applied to the object 4. Using an anilox roller 13 the adhesive is transferred from a reservoir to the printing plate 12. The adhesive is applied to the anilox roller 13, e.g., by a fountain roller printing unit or a chamber scraper system.

Figure 1A:
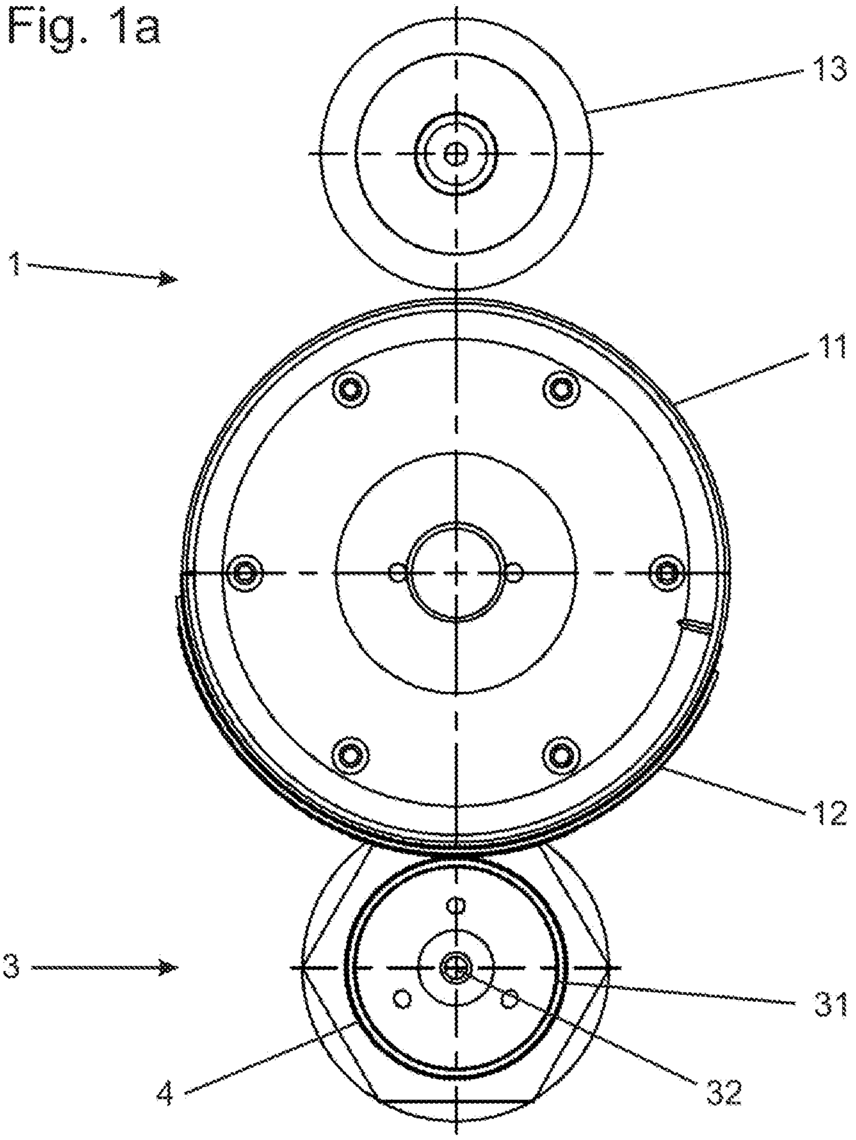
FIG. 1*a* shows a schematic view of a first workstation of an embodiment of an apparatus in accordance with the invention.

The object 4 is held from the inside by a holding device 3 which is designed as a holding mandrel 31. By rotating the mandrel 31 about the axis of rotation 32, the object 4 can also be rotated about this axis. The printing block cylinder 11 together with the printing plate 12 is also rotated at the same time as the holding mandrel 31, so that the adhesive applied to the printing plate 12 is transferred to the surface of the object 4.

Figure 1B:
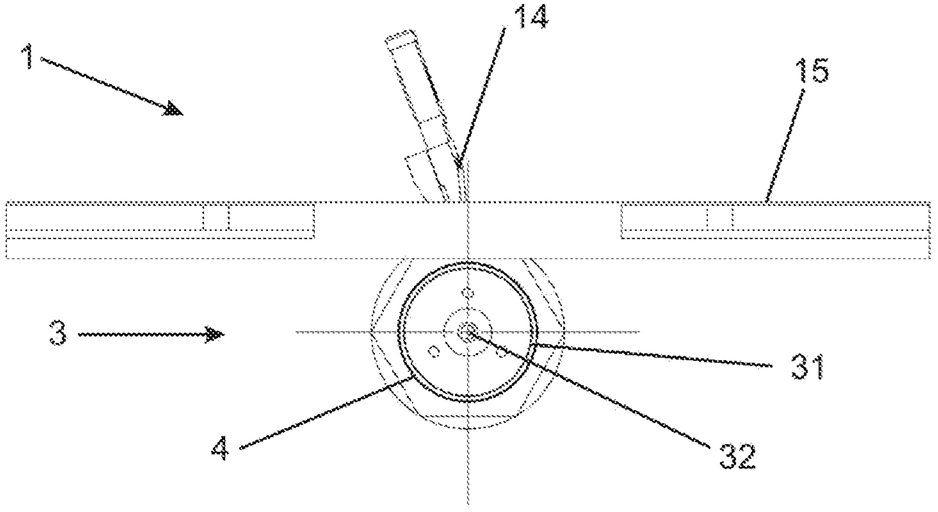
FIG. 1*b* shows a schematic view of a first workstation of another embodiment of an apparatus in accordance with the invention (i) in a side view and (ii) in a perspective view.
Figure 1B:
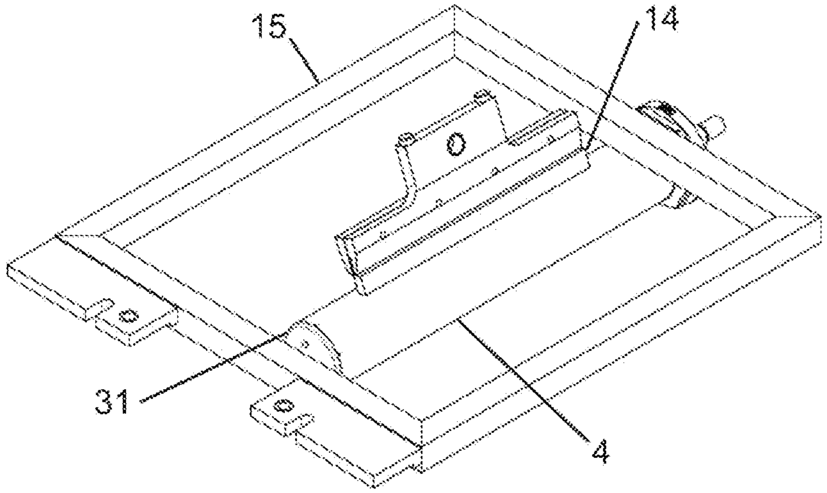

FIG. 1*b* shows a first workstation 1 which is designed as a screen printing station. A screen 15 having a fine-meshed fabric determines the motif in which the adhesive is to be applied to the object 4 by virtue of the fact that the mesh openings of the fabric are made impermeable for the adhesive, e.g., by a template, at the positions where no adhesive is to be applied. A scraper 14 is used to press the adhesive through the fabric of the screen 15 onto the object 4.

The object 4 is held from the inside by a holding device 3 which is designed as a holding mandrel 31. By rotating the holding mandrel 31 about the axis of rotation 32, the object 4 can also be rotated about this axis. At the same time as holding mandrel 31 rotates, a relative linear movement is effected between the holding mandrel 31 and the screen 15 so that as a result the object 4 is rolled along the screen 15. The scraper 14 remains stationary relative to the holding mandrel 31. Therefore, the adhesive is applied to the object 4 in accordance with the motif defined by the template.

Figure 2:
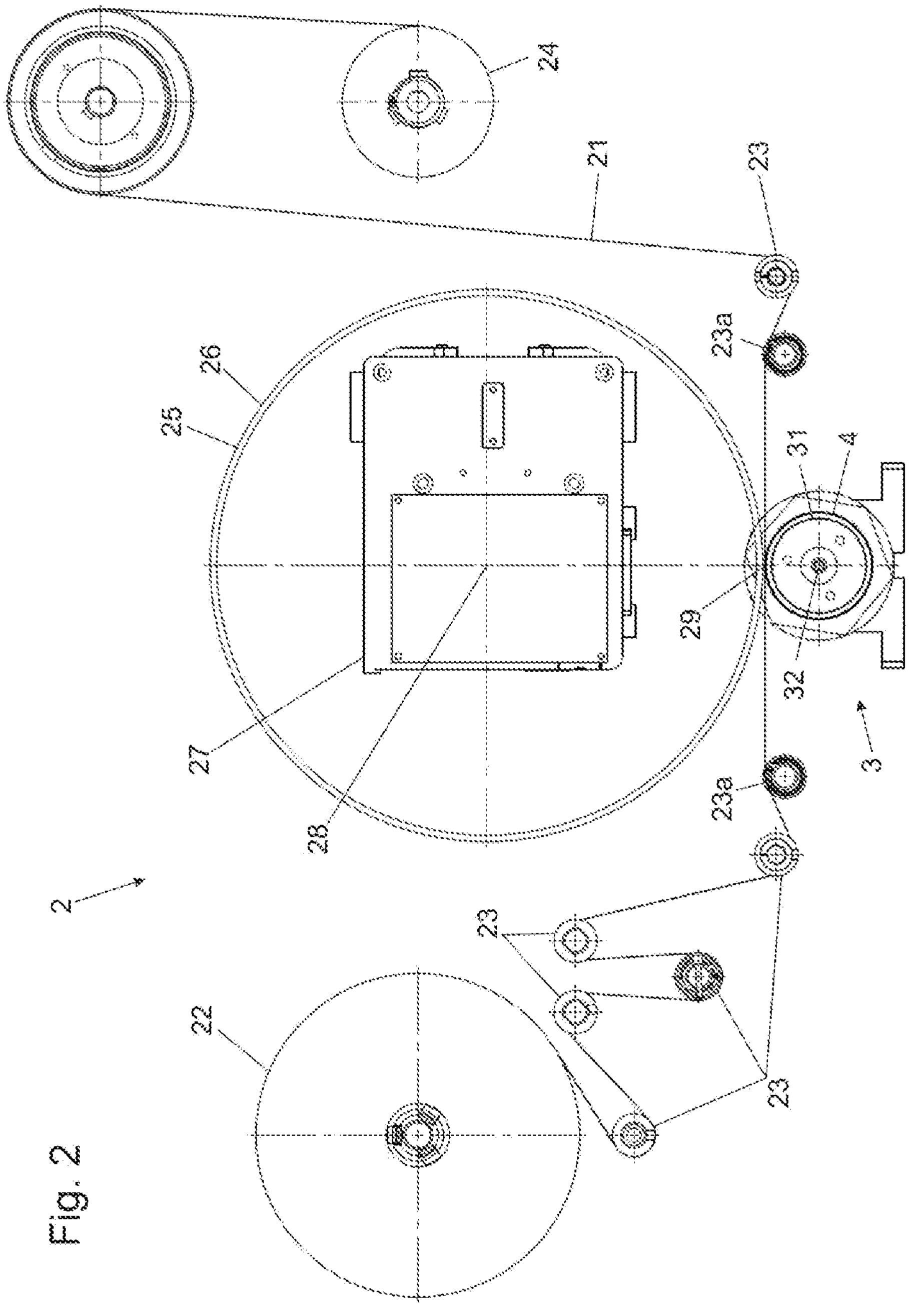
FIG. 2 shows a schematic view of a second workstation of a preferred embodiment of an apparatus in accordance with the invention.
Figure 3:
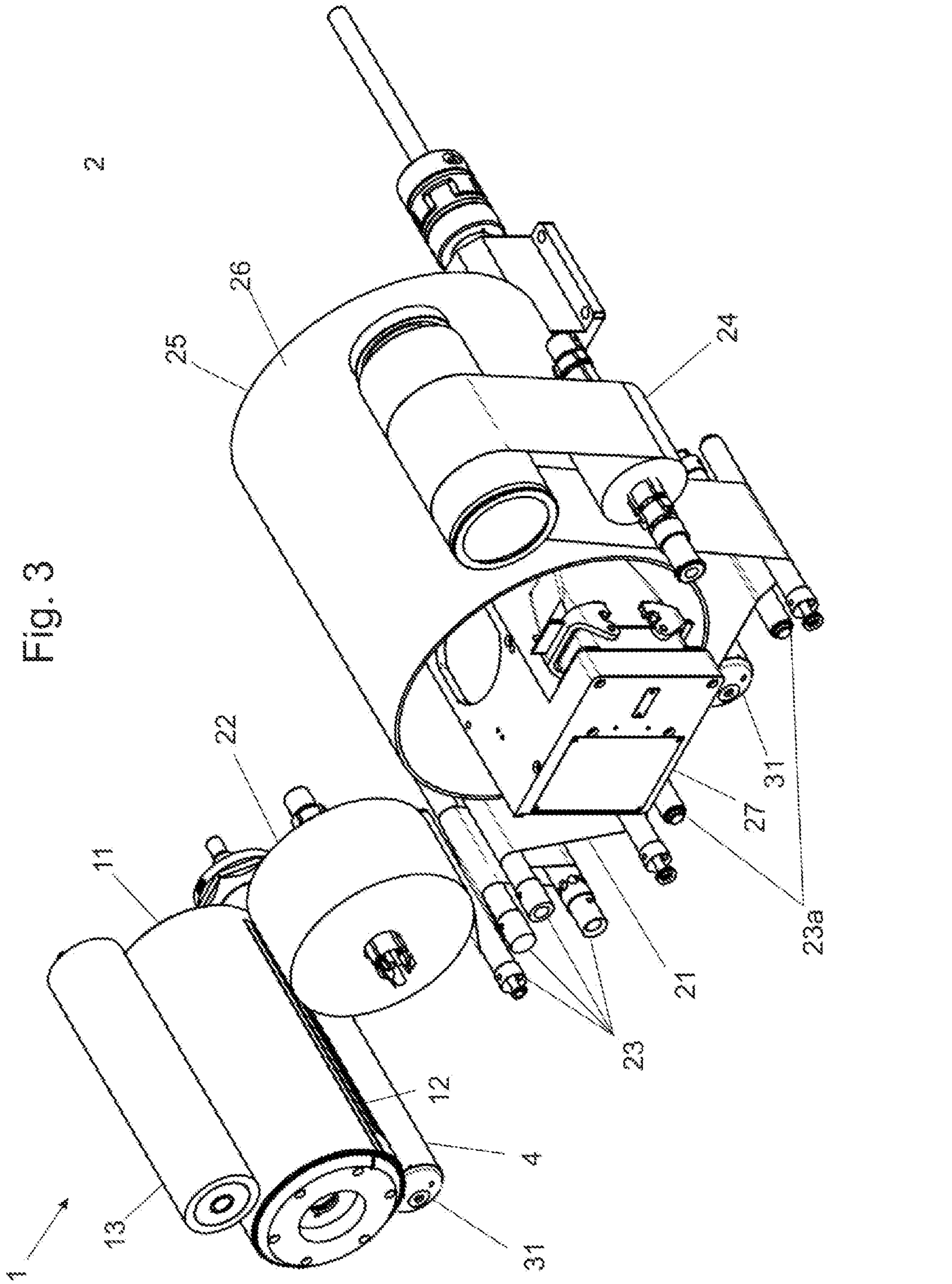
FIG. 3 shows a schematic view of the first workstation of FIG. 1 and of the second workstation of FIG. 2 in a perspective view.

FIGS. 2 and 3 show an embodiment of a second workstation 2. The holding device 3 with the object 4 held thereon was moved on from the first workstation 1 to the second workstation 2 after the adhesive was applied to the object 4. The second workstation comprises a film unwinding arrangement 22, on which the supply of transfer film 21 is received. The transfer film 21 is guided to the object 4 by a plurality of guide rollers 23. The guide rollers 23 are used to adjust inter alia the web tension of the transfer film 21, in order to guide the transfer film 21 without any folds to the object 4. Two further guide rollers 23*a* ensure that the transfer film is guided tangentially past the object 4. The used transfer film 21 is finally guided by further guide rollers 23 to a film wind-up arrangement 24 and is wound up thereon.

In the contact region 29 between the object 4 and transfer film 21, the transfer film 21 is pressed against the object 4 by a pressing device. The pressing device comprises a cylinder 25 which is coated with a silicone layer 26 to compensate for any unevenness. The cylinder 25 is designed as a hollow cylinder so that a UV-radiation source 27 can be disposed in the interior thereof. In order to ensure that the UV-radiation emitted by the UV-radiation source 27 in the direction of the object 4 can exit the cylinder 25, the cylinder 25 and also the coating 26 are formed from materials which are transparent for the UV-radiation required for curing purposes. The cylinder 25 can be made in particular from soda-lime glass, borosilicate glass, PMMA (polymethacrylate, referred to colloquially as plexiglass) or polycarbonate (PC). The coating 26 is mechanically attached on the cylinder 25 in particular by clamping strips. However, this can also be achieved by adhesion by adhesives which are highly transparent in particular for the UV-radiation used and are stable over a period of time when subjected to UV-radiation.

During operation of the second workstation 2, the holding mandrel 31 is rotated with the object 4, which is located thereon, about the axis of rotation 32, while at the same time the transfer film 21 is guided past the object 4. Furthermore, at the same time the cylinder 25 is rotated about the cylinder axis 28 so that the transfer film 21 is pressed against the object 4. The rotational speeds of the cylinder 25 and of the holding mandrel 31 and the transport speed of the transfer film 21 are adapted to one another such that these three elements are moved without rubbing against one another.

The UV-adhesive is cured by the UV-radiation at the same time as the transfer film 21 is pressed onto the object 4. By virtue of the rotation of the object 4 and the tangential progression of the transfer film 21 with respect to the object 4, the transfer film 21 is then removed from the object 4 immediately after curing. At the positions where adhesive has been applied to the object 4, the decorative material (e.g. the metal layer) of the transfer film 21 adheres to the object 4 once the adhesive has cured. At the positions where there was no adhesive, the decorative material remains on the transfer film 21.

Further steps for treating the object 4 can be carried out at further workstations. For example, the object 4 can have different colors printed thereon, the surface of the object 4 can be treated in order to ensure, e.g., a better reception of color, or finally the object 4 can be provided with a protective layer. These steps can be performed at workstations upstream or also downstream of the workstations responsible for cold-stamping. The workstations can be arranged, e.g., in a longitudinal transfer system or in a revolving transfer system.

By virtue of the fact that the cold-stamping method in accordance with the invention can be performed at workstations of a longitudinal transfer system or a revolving transfer system, without the object having to be transferred to a different holding device, it is possible to integrate the cold-stamping method in a problem-free manner into the process of producing the object.

Figure 4:
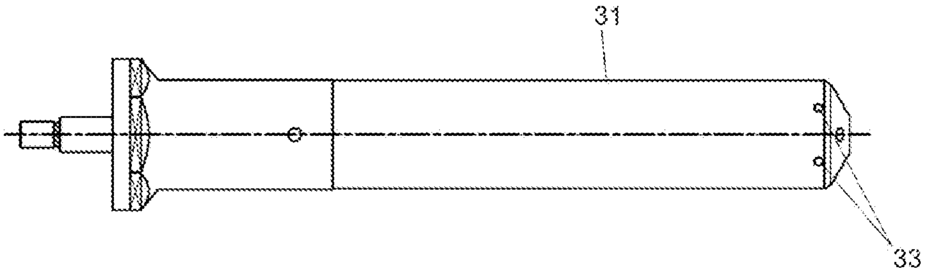
FIG. 4 shows a schematic view of a first exemplary holding device.
Figure 5:
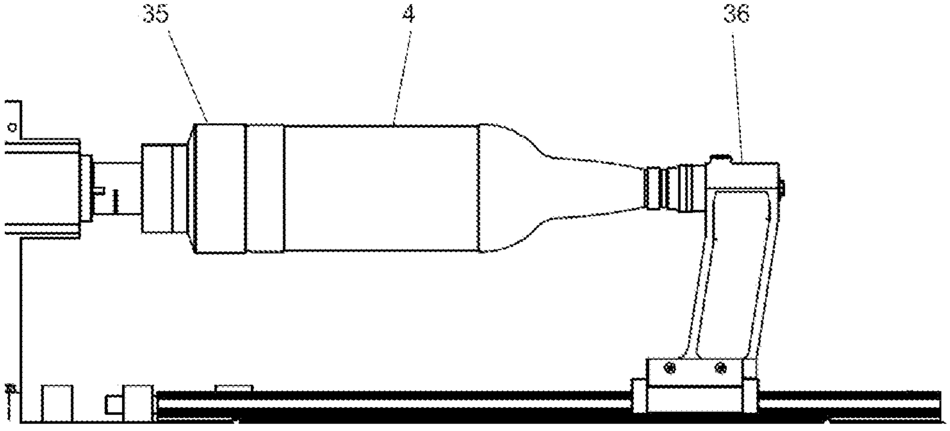
FIG. 5 shows a schematic view of a second exemplary holding device.

FIGS. 4 and 5 show exemplified embodiments of holding devices which can be used in an apparatus in accordance with the invention or with a method in accordance with the invention. The holding device illustrated in FIG. 4 comprises a holding mandrel 31, onto which the object is slid. The diameter of the holding mandrel 31 is selected such that the object is held in a frictionally engaged manner on the holding mandrel 31. In order to improve the manner in which the object is held on the holding mandrel 31, air can be extracted by suction through openings 33 at the free end of the holding mandrel 31, whereby the object is drawn onto the holding mandrel 31 by reason of the vacuum in the interior. As a result, the object is seated firmly on the holding mandrel 31 and can be processed at the workstations, even on the entire surface if required.

The holding device illustrated in FIG. 5 holds the object 4 (in this case a bottle, for example) by virtue of the fact that at one end the object 4 is clamped in a holder 35 and at the opposite end is mounted in a rotatable manner in a counter bearing 36. By rotating the holder 35 about an axis, the object 4 is also rotated about its axis of rotation and can be processed at workstations. Such a holding device can then be used, e.g., if one side of the object 4 does not comprise an opening large enough for a holding mandrel.

Figure 6:
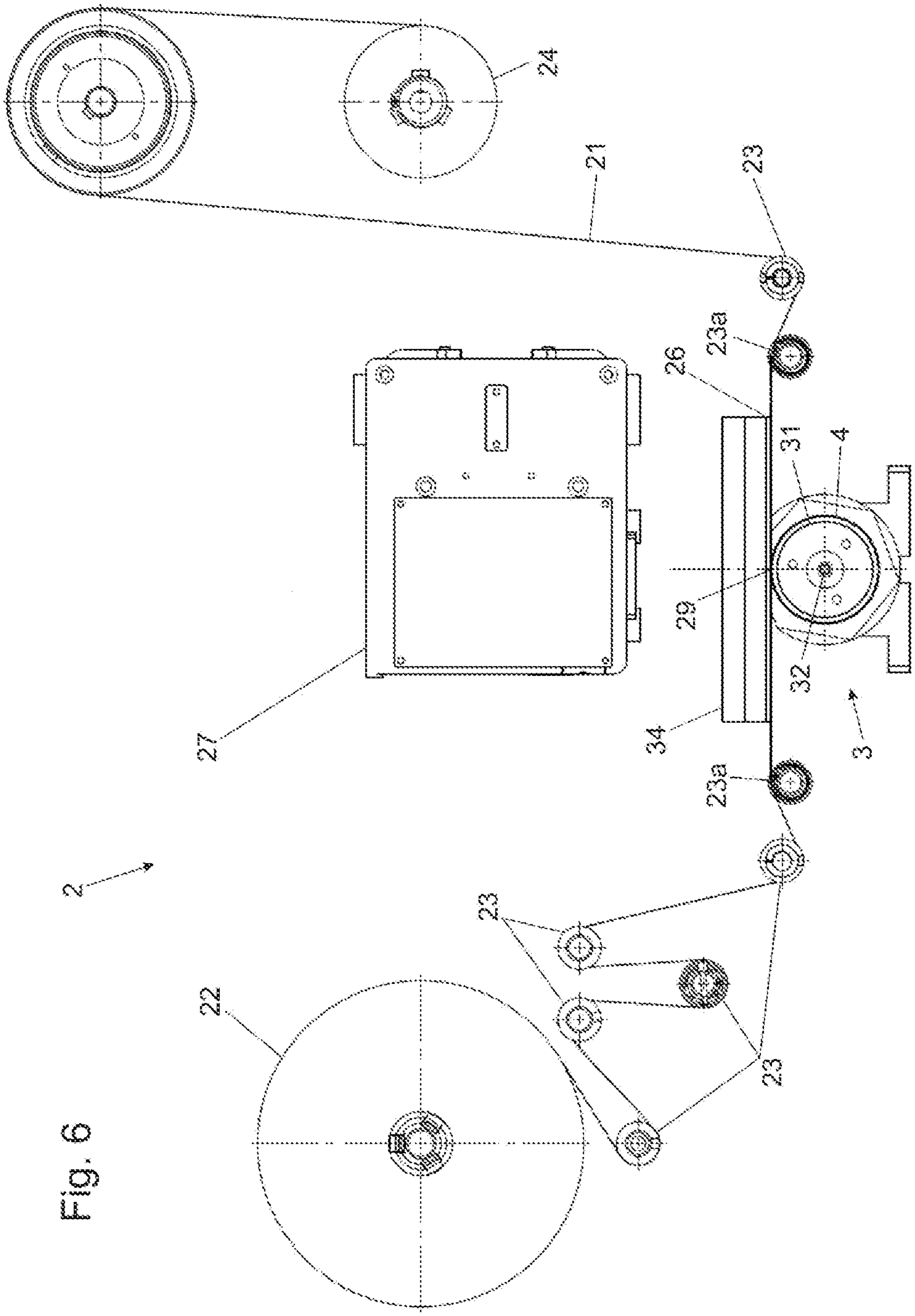
FIG. 6 shows a schematic view of a second workstation of another embodiment of an apparatus in accordance with the invention.

FIG. 6 shows a further embodiment of a second workstation 2. The guide of the transfer film 21 corresponds substantially to the embodiment illustrated in FIGS. 2 and 3 and will not be described again. The pressing device which presses the transfer film 21 against the object 4 in the contact region 29 between the object 4 and transfer film 21 comprises in the embodiment of FIG. 6 a planar pressing plate 34 which is coated with a silicone layer 26, e.g., for compensating for any unevenness and for reducing the friction between the pressing device and transfer film 21.

The UV-radiation source 27 is arranged above the pressing plate 34, i.e., on the other side of the pressing plate 34 than the transfer film 21. The pressing plate 34 and the coating 26 are formed from materials which are transparent for the UV-radiation required for curing purposes, which means that the UV-radiation emitted by the UV-radiation source 27 in the direction of the object 4 can pass through the pressing plate 34 and the coating 26. The pressing plate 34 can be made in particular from soda-lime glass, borosilicate glass, PMMA (polymethacrylate, referred to colloquially as plexiglass) or polycarbonate (PC). The coating 26 is mechanically attached to the pressing plate 34 in particular by clamping strips or screws. However, this can also be achieved by adhesion by adhesives which are highly transparent in particular for the UV-radiation used and are stable over a period of time when subjected to UV-radiation. During operation of the second workstation 2, the holding mandrel 31 is rotated with the object 4, which is located thereon, about the axis of rotation 32, while at the same time the transfer film 21 is guided past the object 4.

The UV-adhesive is cured by the UV-radiation at the same time as the transfer film 21 is pressed onto the object 4. By virtue of the rotation of the object 4 and the tangential progression of the transfer film 21 with respect to the object 4, the transfer film 21 is then removed from the object 4 immediately after curing. At the positions where adhesive has been applied to the object 4, the decorative material (e.g. the metal layer) of the transfer film 21 adheres to the object 4 once the adhesive has cured. At the positions where there was no adhesive, the decorative material remains on the transfer film 21.

As in the case of the embodiment of FIGS. 2 and 3, further steps for treating the object 4 can be carried out at further workstations.

Of course, the invention is not limited to the holding devices which are illustrated. For the invention, any holding device can be used which renders it possible to hold the three-dimensional object in such a manner that all of the positions on the object which are to be processed are accessible.

The second workstations illustrated in the drawings do not necessarily have to be used together with the first workstation illustrated in the drawings. In particular, it is not necessary for the first workstation to be a screen printing or a flexographic printing station. The first workstation could also be a digital printing station (e.g. ink-jet).

LIST OF REFERENCE NUMERALS

1 first workstation
2 second workstation
3 holding device
4 object
11 printing block cylinder
12 printing plate

13 anilox roller
14 scraper
15 screen
21 transfer film
22 film unwinding arrangement
23 guide rollers
23*a* guide rollers
24 film winding-up arrangement
25 pressing cylinder
26 pressing layer
27 UV-radiation source
28 cylinder axis
29 contact point
31 holding mandrel
32 axis of rotation
33 openings
34 pressing plate
35 holder
36 counter bearing

What is claimed is:

1. A method for cold-stamping a three-dimensional object, wherein the three-dimensional object is held either rotatably around an axis of rotation or is firmly fixed by a holding device, the method comprising:

applying an adhesive to the three-dimensional object at a first work station, wherein the adhesive is a UV-adhesive and wherein a curing of the adhesive is performed by irradiation with UV-radiation generated by a UV-radiation source; and pressing a transfer film comprising a decorative layer and a carrier film onto the three-dimensional object by a single pressing device at a second work station, wherein the adhesive is initially simultaneously at least partially cured by UV radiation at the same time as the transfer film is pressed onto the three-dimensional object by the single pressing device at the second workstation at a position where the transfer film is in contact with the single pressing device, wherein the single pressing device comprises a cylinder which can be rotated around a cylinder axis, wherein the UV-radiation source can be arranged within the cylinder of the single pressing device;

wherein the single pressing device is transparent for UV-radiation at least in partial regions and is arranged at least partially between the UV-radiation source and the holding device;

wherein the single pressing device comprises a flexible pressing layer, and wherein after at least partial curing of the adhesive, the carrier film is removed from the three-dimensional object and the three-dimensional object is subjected once again to UV-radiation.

2. The method according to claim 1, wherein at least one of the single pressing device or the flexible pressing layer is made of silicone and comprises a thickness in the range of 1 mm to 20 mm in a region to be penetrated by UV-radiation.

3. The method according to claim 2, wherein the silicone comprises a hardness in the range of 30° Shore A to 70° Shore A.

4. The method according to claim 1, wherein the decorative layer comprises at least one of at least one metallic layer, at least one dielectric layer or at least one transparent, translucent, or opaque color layer.

5. The method according to claim 4, wherein the decorative layer comprises the metallic, dielectric, and/or color layer in each case over an entire surface or partially.

6. The method according to claim 1, wherein at one or a plurality of further workstations downstream of the second workstation for pressing the transfer film and curing the adhesive an additional coating is provided on the three-dimensional object in the region of the decorative material, and/or in regions adjacent thereto, or on the entire surface thereof.

7. The method according to claim 6, wherein the coating is performed by one or plurality or additionally applied transparent, translucent, or opaque lacquer layers.

8. A method according to claim 1, wherein the pressing of the transfer film onto the three-dimensional object comprises:

rotating the three-dimensional object around the axis of rotation;

guiding the transfer film tangentially with respect to an outer periphery of the three-dimensional object; and pressing the transfer film onto the three-dimensional object along a contact line between the three-dimensional object and transfer film by the single pressing device.

9. A method according to claim 1, wherein the single pressing device is moved such that a surface speed of the single pressing device corresponds to a surface speed of the three-dimensional object, and wherein the transfer film is moved such that the surface speed of the transfer film corresponds to the surface speed of the three-dimensional object.

10. The method according to claim 1, wherein the pressing of the transfer film onto the three-dimensional object is performed by guiding the transfer film between the cylinder and the three-dimensional object while the cylinder rotates around the cylinder axis and the three-dimensional object simultaneously rotates around the axis of rotation.

11. The method according to claim 1, wherein the pressing of the transfer film onto the three-dimensional object is performed by guiding the cylinder linearly over the three-dimensional object as a stationary object while the cylinder simultaneously rotates around the cylinder axis.

12. The method according to claim 1, wherein the transfer film or the decorative layer comprises a transmittance in the range of 5% to 70%, for UV-radiation in the wavelength range of 250 nm to 420 nm.

13. The method according to claim 1, wherein at least one of the single pressing device or the flexible pressing layer is transparent or translucent in the range of 30% to 100% in the wavelength range of 250 nm to 420 nm.

14. The method according to claim 1, wherein the flexible pressing layer is formed to be flat.

15. The method according to claim 1, wherein at least one of the single pressing device or the flexible pressing layer at least partially comprises a structured or textured surface.

16. The method according to claim 1, wherein the decorative layer comprises a lacquer having impressed relief structures, which are macroscopic, refractively effective, and/or microscopic, in particular effective in terms of diffractive optics.

17. The method according to claim 1, wherein the decorative layer is applied in a desired position on the three-dimensional object with a register accuracy of ±1 mm.

18. The method according to claim 1, wherein at one or a plurality of further workstations upstream of the first workstation for applying the adhesive, a coating is provided on the three-dimensional object partially or on the entire surface thereof, by screen printing, flexographic printing and/or digital printing.

19. The method according to claim 1, wherein the first workstation for applying the adhesive, the second workstation for pressing the transfer film and curing the adhesive are arranged in-line.

20. A method for cold-stamping a three-dimensional object, wherein the object is held either rotatably around an axis of rotation or is firmly fixed by a holding device, the method comprising:

applying an adhesive to the object at a first work station, wherein the adhesive is a UV-adhesive and wherein a curing of the adhesive is performed by irradiation with UV-radiation generated by a UV-radiation source; and pressing a transfer film comprising a decorative layer and a carrier film onto the object by a single pressing device at a second work station, wherein the adhesive is simultaneously cured at the same time as the transfer film is pressed onto the object by the single pressing device at the second workstation at a position where the transfer film is in contact with the single pressing device;

wherein the single pressing device is transparent for UV-radiation at least in partial regions and is arranged at least partially between the UV-radiation source and the holding device;

wherein the single pressing device comprises a planar plate, wherein the planar plate is arranged between the UV irradiation device and the three-dimensional object; and wherein the single pressing device comprises a flexible pressing layer.

* * * * *